Patented Feb. 21, 1928.

1,660,196

UNITED STATES PATENT OFFICE.

JOHN HOEFFLER, OF NEW YORK, N. Y., ASSIGNOR TO J. HOEFFLER & CO., INC., OF NEW YORK, N. Y., A CORPORATION OF NEW YORK.

WATER-COLOR PRINTING INK AND PROCESS OF MAKING SAME.

No Drawing. Application filed March 12, 1927. Serial No. 175,008.

My invention relates to a water color process ink for printing three and four color process and half tone plates, and to the process of producing an ink of this kind.

The object of my invention is to produce an ink, for the purposes stated, superior both in relation to permanency and color effect to any ink known to me.

In carrying my process into practice, I use ingredients well known in the ink maker's art, but I adopt an entirely novel procedure by which the superior results referred to are obtained.

The following is a specific example of my new process: Two parts by weight of gum arabic mixed with two parts by weight of water are added to eighteen parts by weight of glycerine, and the entire mixture is then heated until it attains the specific gravity of 1280 degrees Baumé. Heating to the extent indicated has the effect of dehydrating the mixture and the product is an ink base having a paste like consistency. To this base a pigment color is added and well mixed and the mixture ground in the usual manner in an ink grinding mill.

It will be understood that the proportions of ingredients given above may be varied within suitable limits but as a general rule the most desirable results are obtained by using the ingredients in the proportions specified.

I am aware that gum arabic and glycerine have heretofore been employed in preparing ink bases, but I believe that I am the first to dehydrate a mixture of these constituents and as a result of this step to produce an ink which may be highly advantageously used on any printing press for three and four color process and half tone plates.

I claim:

1. The herein described process of producing a base for a water color printing ink, which consists in forming a solution of two parts by weight of gum arabic and two parts by weight of water, mixing the solution with eighteen parts by weight of glycerine, and heating the mixture until it attains the specific gravity of 1280 degrees Baumé.

2. The herein described process of producing a water color printing ink, which consists in mixing a solution of gum arabic with a preponderating quantity of glycerine, dehydrating the mixture by heat to produce a paste, adding pigment to the paste and grinding the resulting mixture.

3. The herein described process of producing a water color printing ink, which consists in dissolving two parts by weight of gum arabic in two parts by weight of water, mixing the solution with eighteen parts by weight of glycerine, heating the mixture until it attains a specific gravity of 1280 degrees Baumé and is in the form of a paste, adding pigment to the paste and grinding the resulting mixture.

In testimony whereof I affix my signature.

JOHN HOEFFLER.